July 2, 1963 D. E. SABLE 3,095,987
PIGGY-BACK TRANSPORTATION SYSTEM
Filed Nov. 19, 1959 5 Sheets-Sheet 1
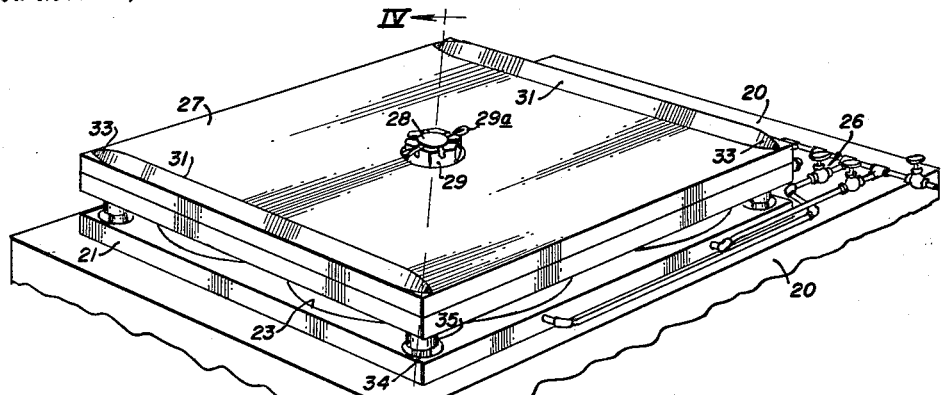
FIG. I.
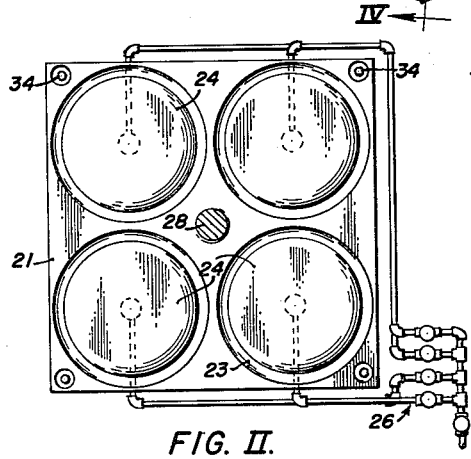
FIG. II.
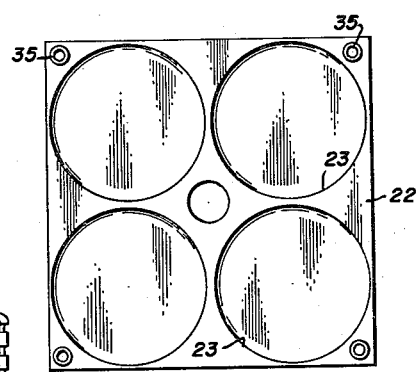
FIG. III.
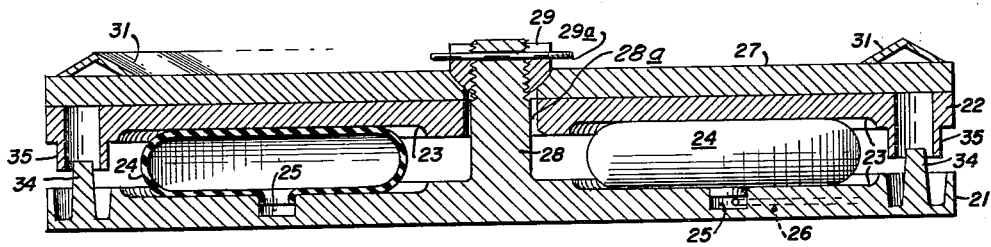
FIG. IV.
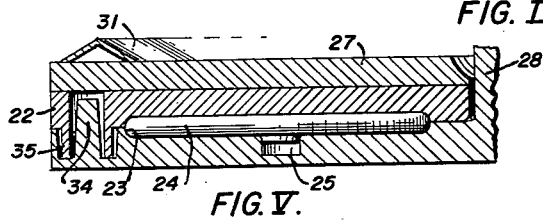
FIG. V.
DONALD E. SABLE
INVENTOR.
BY
ATTORNEY July 2, 1963  D. E. SABLE  3,095,987
PIGGY-BACK TRANSPORTATION SYSTEM
Filed Nov. 19, 1959  5 Sheets-Sheet 2
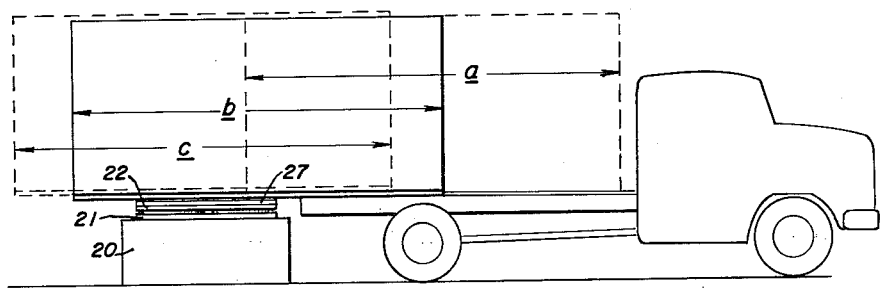
FIG. VII A.
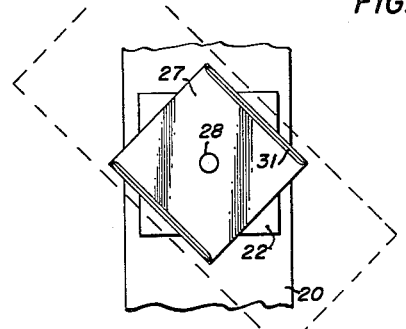
FIG. VII.
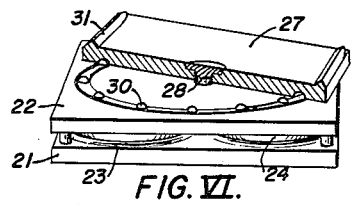
FIG. VI.
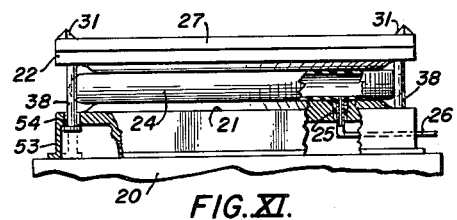
FIG. XI.
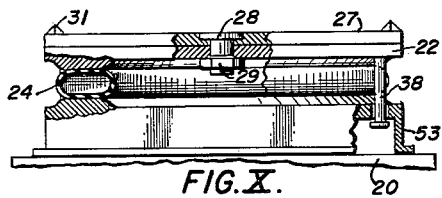
FIG. X.
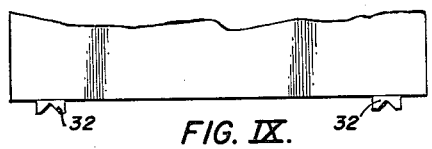
FIG. IX.
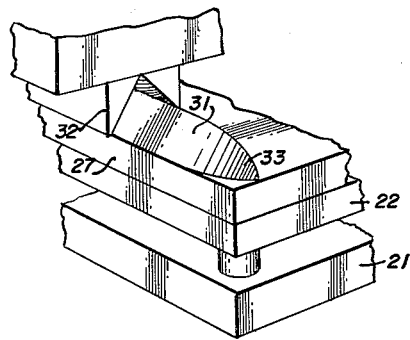
FIG. VIII.
DONALD E. SABLE
INVENTOR.
BY [signature]
ATTORNEY

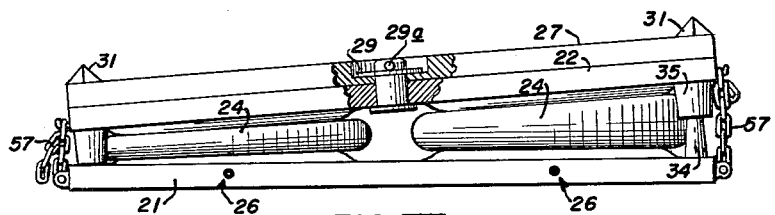
FIG. XII.
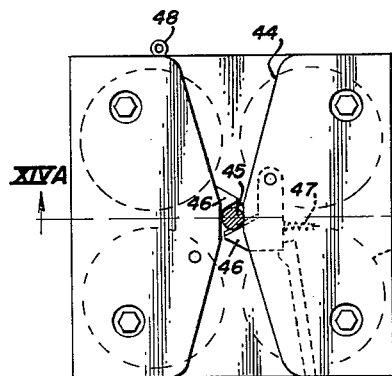
FIG. XIV.
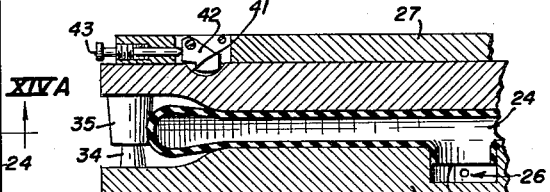
FIG. XVI.
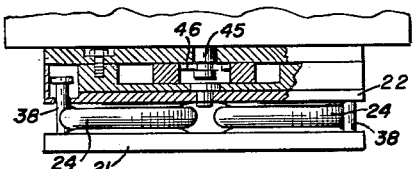
FIG. XIVA.
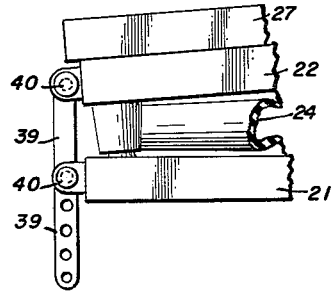
FIG. XVII.
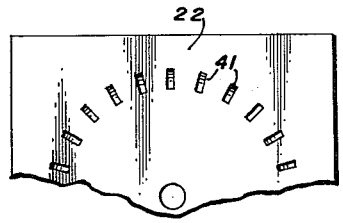
FIG. XV.
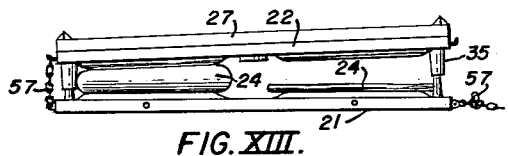
FIG. XIII.
DONALD E. SABLE
INVENTOR.

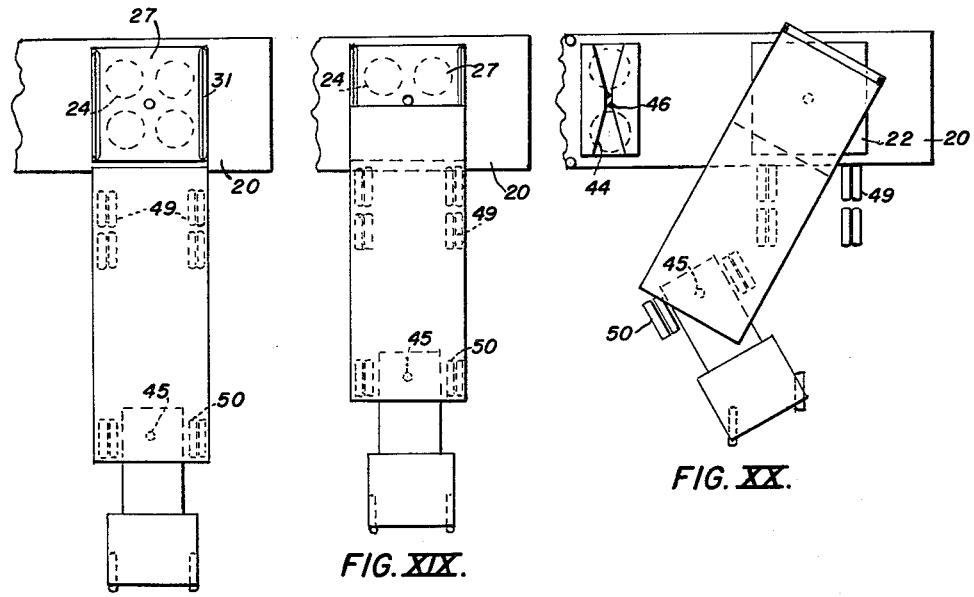
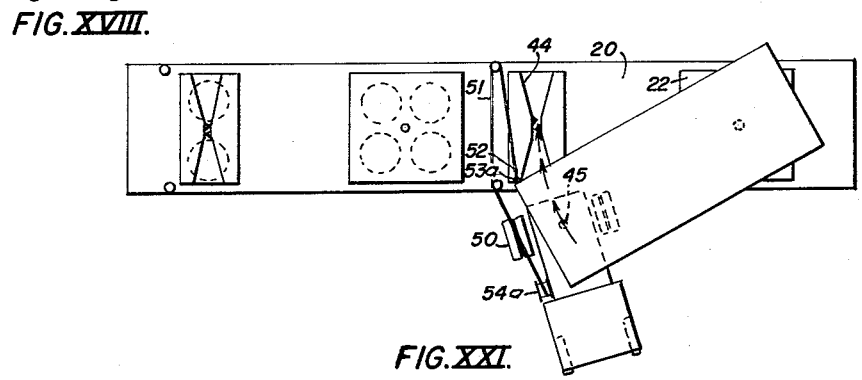
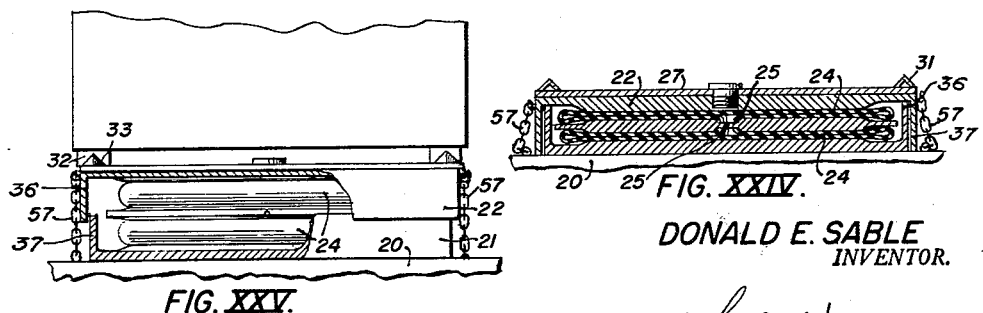

July 2, 1963  D. E. SABLE  3,095,987
PIGGY-BACK TRANSPORTATION SYSTEM
Filed Nov. 19, 1959  5 Sheets-Sheet 5
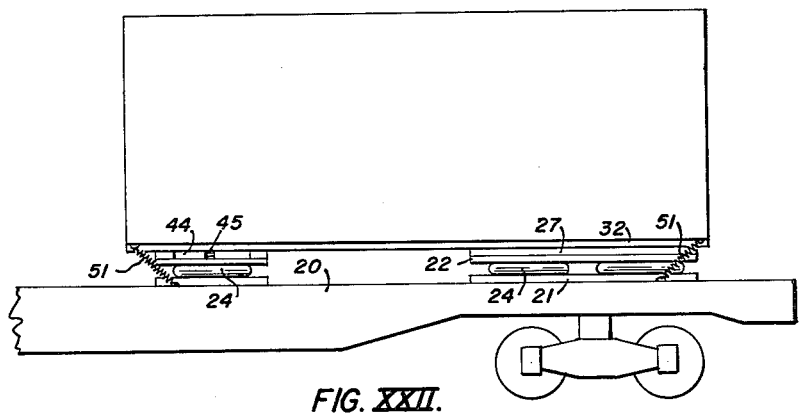
FIG. XXII.
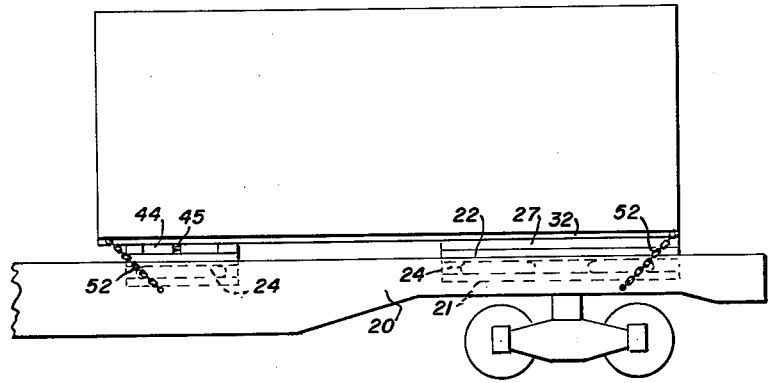
FIG. XXIII.
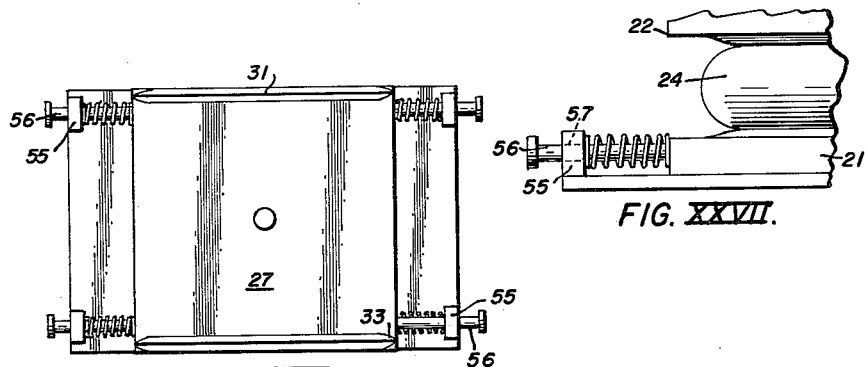
FIG. XXVI.
FIG. XXVII.
DONALD E. SABLE
INVENTOR.
BY
ATTORNEY

United States Patent Office 3,095,987
Patented July 2, 1963

3,095,987
PIGGY-BACK TRANSPORTATION SYSTEM
Donald E. Sable, Kansas City, Mo.
(4413 Windsor Parkway, Dallas 5, Tex.)
Filed Nov. 19, 1959, Ser. No. 854,192
12 Claims. (Cl. 214—38)

This invention relates to what is known as piggy-back hauling of truck boxes or trailers on railway flat cars and the like. Novel features of the invention include means associated with the railway car for readily receiving one end of a trailer, elevating the same by fluid actuated means and permitting the trailer to be readily rotated by the tractor while so elevated and onto a cooperating elevating and cushioning means associated with another position on the railway car. The fluid actuated means being adjustably and selectively actuatable so as to level the trailer and to be supportive of variable positions of the load in the trailer. The supporting means also acting as or providing air cushions supporting the load during the transporting ride from origin to destination. One of the major shocks to be effectively cushioned is that resulting from humping, as will more fully appear from the following description. The invention further provides novel means whereby the trailer may be received and secured upon the load elevating and cushioning means and carried thereby upon and with the railway car. A still further object of the invention provides the cushioning means so operably related to the other elements as to provide for movement laterally of the railway car while supporting the trailer or other similar load.

More specifically the invention provides in a preferred form a plurality of tubes of disk type positioned between and carried by relatively movable lower and upper rigid or plate members, with suitable piping and valves connected with inlets in the tubes and a source of air or other suitable medium under pressure for selective inflation of the tubes and means for exhausting the air selectively from the tubes. Other forms of tubes such as toroid, etc., may be employed with equal facility in the novel assembly. Hereinafter this assembly is sometimes referred to as the cushioning means.

These and other novel features of the invention will readily appear to those skilled in the art from the following description together with the accompanying drawing in which:

FIG. I is a perspective view of my cushioning means;
FIG. II shows a lower plate of FIG. I with tube receiving cavities, tubes, piping and valves, viewed from above;
FIG. III shows the upper plate of FIG. I with tube receiving cavities cooperative with cavities of FIG. II, as viewed from beneath;
FIG. IV is a section along line IV—IV of FIG. I;
FIG. V shows the position of the parts of FIG. IV with tubes deflated;
FIG. VI shows the turntable mounted on top of the upper plate of FIGS. I, II and III;
FIG. VII shows turntable of FIGS. I, IV and V in plan;
FIG. VIIA shows a box being deposited on top of a single cushioning means;
FIG. VIII shows a portion of a preferred form of the load receiving support on top of the turntable;
FIG. IX shows a view of preferred form of beam under trailer box cooperative with receiving means of FIG. VIII;
FIGS. X and XI show sections of modified cushioning means employing toroidal forms of tubes and inflation limiting means;
FIG. XII shows an elevation of FIG. I with one tube deflated and one tube partially inflated;

FIG. XIII shows tube of FIG. XII inflated to lift upper plate clear of deflated tubes;
FIG. XIV shows alternate form of turntable and load receiving and securing means;
FIG. XIVA is a section along line XIVa—XIVa of FIG. XIV;
FIG. XV is a part plan of the upper plate of FIG. I, in detail;
FIG. XVI is a section of the turntable and upper plate of FIG. XV showing means for securing the turntable in selective rotated relation with the plate;
FIG. XVII is a section of cushioning means showing alternate form of inflation limiting means;
FIG. XVIII shows a plan view of my elevating turntable mounted adjacent to an end of a railway flat car about to receive the rear end of a motor truck trailer;
FIG. XIX is a plan view showing trailer wheels dropped and rear end of trailer box mounted upon my cushioning means of FIG. I with tubes deflated;
FIG. XX is a plan view showing front end of trailer box rotated toward mounting position upon a second cushioning means of modified form;
FIG. XXI shows front end of box being received by cushioning means of FIG. XX;
FIG. XXII shows a trailer box mounted on a flat car and snubbed to the car against load supporting pressures in the air tubes of the cushioning means;
FIG. XXIII shows an elevation of cushioning means embedded in the floor of a flat car;
FIG. XXIV shows a plurality of tubes superimposed and deflated;
FIGURE XXV shows the tubes of FIG. XXIV inflated;
FIGS. XXVI and XXVII show views of spring loaded means for mounting the base of the cushioning means movably of the flat car.

Proceeding now with the description, similar elements are indicated by like references, wherein: 20 is the floor of a railway flat car; 21 is the base or lower plate of my elevating turntable cushion means; 22 is the upper plate, each plate being provided with cavities 23 for receiving part of air tube 24, the latter being of hollow closed fabric reinforced formation of types well known in the tube art and readily available from commercial sources, the same being provided with spuds 25 adapted to receive piping and valve assemblies 26, which latter communicate with a source of pressure supply and have valves so positioned that air or other fluid from the supply may be selectively admitted to and released from the tubes, such assemblies being so readily understood by those skilled in the art as to require no detailed description. Rotatably mounted on top of plate 22 is turntable 27 which is secured against dislodgment therefrom as by pin 28 and nut 29 secured by cotter pin 29a. Friction surfaces may be provided between turntable 27 and plate 22 or ball or roller bearings 30 may be operably interposed therebetween as shown in FIG. VI. On top of turntable 27 there may be mounted load receiving and carrying members 31 for cooperating with channel supports 32 under the truck body or box, the tapered ends 33 of members 31 providing means whereby to facilitate mating with the channel supports as the body or box is moved into position upon the turntable. In a preferred form cavities 23—23 of the plates receive and surround portions of tubes 24 which serve to embrace and secure the tubes in operable position. Tapered pins 34 and tapered receptacles 35 may be matingly positioned about the faces of the plates 21 and 22 with clearance therebetween to permit radial distortion of the tubes as desired about pin 28 in the receiving opening therefor in plate 21. In an alternate form shown in FIGS. XXIV and XXV telescoping guide members 36—37 in the form of plates welded or otherwise secured to or formed with the plates 21—22 adjacent their peripheries as desired to form protective shields against injuries to the tubes, space being provided between guide members 36 and 37 to permit desired radial distortion of the tubes particularly when inflated under load and being distorted radially in cushioning shocks, vibrations, swaying and humping of the load. Modifications might omit center pin 28 and provide other means such as bolts 38, FIGS. X, XI and XIVA or straps 39 and pins 40 FIG. XVII to limit inflationary expansion of the tubes as desired. This limiting of inflation may also be accomplished as by snubbers shown in FIGS. XII, XXII and XXIII.

In FIG. XV are shown slots 41 in top plate 22 adapted to receive dog 42 shown in FIG. XVI mounted on turntable 27 and manipulatable by link means 43 thus securing turntable rotatively of plate 22.

In FIGS. XIV, XX and XXI is shown a slotted opening 44 in the upper partition of the turntable 27 adapted to receive trailer king pin 45 which latter may be secured against dislodgment therefrom by dog 46 which is urged into securing position by spring 47 and manipulatable manually by link means 48 more clearly shown in FIGS. XIV and XIVA. It will be noted that in FIG. XIV slots 44 are provided in opposed relation in the turntable which arrangement might enable the truck driver to approach the flat car for loading or unloading the trailer from either side of the car for a more convenient choice of sides of the railway track depending upon terrain, obstructions or the like and without being required to manipulate the turntable under load of the trailer. In several views the assembled elevating cushioning turntable is shown operably positioned as a unit on the flat car viz. FIGS. I, VII, VIIA, X, XI, or supportively related to the flat car and trailer as shown in FIGS. VIIA, XIX, XX, XXI, XXIV and XXV. In FIGS. XX and XXI the trailer box is shown mounted at one end on a cushion-turntable assembly with trailer wheels 49 dropped and being manipulated by the tractor into mounting position at the opposite end by the tractor whose wheels 50 are shown in position under the trailer and auxiliary means as cable 51 engaged to the trailer by hook 52 engaging with eye 53a and manipulatable as by winch 54a to suck the end of the trailer into carrying position. The winch 54a may be operably connected with the truck's electrical, hydraulic or mechanical power sources for convenience or with outside power sources such as the air brake service of the train of cars, or manually operated as desired. In FIG. XXII the trailer box is in position for transit and the tractor wheels 50 have been moved away from the car. The box is shown fully mounted in FIGS. XXII, and XXIII and lashed to the flat car as by snubbers 51 or 52. The elevating cushion turntable assembly may be secured to the flat car as by brackets 53, FIGS. X and XI being bolted down to the car frame or floor. It will be noted that brackets 53 are provided with enlarged openings 54 which permit bolts 38 and upper plates 22 to move radially of the cushions 24. An alternate method of securing plate 21 to the flat car deck is shown in FIGS. XXVI and XXVII wherein brackets 55 are secured to the car floor having spring loaded pins 56 passing through suitable openings 57 in the brackets whereby the bottom plate and its supported assembly are movably secured with the car in directions as desired.

Cavities in plates 21 and 22 may be deep enough to permit the mating surfaces of the plates to come together and resist the entire load upon the turntable, or the inner surfaces of the tubes may mate before the plates contact with each other in which latter arrangement the load on the turntable may be supported by the mated flat body sections of the tubes which provides a noise-reducing rubber cushion between the plates when the tubes are fully deflated. In yet another form not shown other forms of rubber bumpers may be interposed between the plates.

It will be noted that spuds enter the disk tubes at the center of their sides and enter the toroidal forms at their flat surfaces in preferred arrangements although I am aware of other workable arrangements.

It is further pointed out that as shown in FIGS. VIII, XVIII, XIX, XX and XXI, one end of the trailer is slidably mounted on its supporting turntable through elements 31 on the table and 32 underside the trailer while the opposite end of the trailer is non-slidably engaged by king-pin 45 of the trailer engaging through slot 44 with turntable 27, although I may slidably or fixedly secure each end of the trailer with the turntables.

Trailers are constructed to sustain their loads from mountings near each end, while boxes may be so constructed to support their loads from a more central position of their bodies as indicated in FIGS. VII and VIIA. For carrying these boxes only one turntable, cushion elevating means is preferably employed.

The operation is as follows: Plates 21 and 22 are assembled about deflated tubes 24 and secured against separation beyond the point of desired maximum expansion of the sidewalls of the tubes when inflated, as by elements 38, 39—40 or chains 57. Then turntable 27 is rotatably mounted on plate 22. This assembly is mounted upon and secured to the flat car, the piping and valve assembly being connected with the cushion tubes through their respective spuds and to a source of air under pressure. The tubes are deflated so as to lower the turntable which is now rotated into proper position to receive the trailer box, on elements 31. The tractor now backs up to move the end of the box onto the receiver and by means of the tapered mating ends of elements 31 of the table and 32 of the trailer. Air is introduced into the tubes which raises the table and its superimposed load. The trailer wheels are removed and the trailer is pushed onto the receiver as desired by the tractor as indicated in FIGS. XVIII and XIX. The fifth wheel of the tractor is now manipulated by conventional means to raise the front end of the trailer which may now be rotated upon the mounted turntable free from contact with the flat car to the position as indicated in FIGS. XX and XXI while the winch line 51 is engaged with the front end of the trailer and drawn taut by the winch to secure the trailer in position with the second cushion-elevating means which at this point is in its lowered position. The tractor fifth wheel now is lowered to release the trailer which is winched onto and secured in transporting position on the second of the elevating-cushioning means. The first cushioning tubes may now be deflated whereupon the snubbers are secured both to the flat car and the trailer structure at proper angles to resist end or side motion between the flat car and trailer with enough slack in them to provide for a lifting of the trailer against the snubbers as the tubes may now be inflated to less than their initially limited position which provides an air-cushioned ride of the trailer and contents. The tubes can be selectively inflated to provide a proper support, balancing and cushioning of the load.

It will be understood that in a preferred arrangement the snubbers would secure the trailer within desired maximum movement with relation to the flat car and that the tubes would be inflated to attain the optimum cushioning and balancing of the load of the ride for any given load and its position in the trailer and that the upper plates and supported tables could move radially of the tube cushions and that the tubes would offer increasing resistance to these radial movements as the latter increasingly distorted the tube cushions in response to shocks and stresses incident to rail travel.

As shown in FIG. IV the cushion tubes 24 are inflated to limit controlled by nut 29 with lateral movement of upper plate 22 about pin 28 provided within limits of enlarged opening 28a. While the tube inflation at optimum load transporting position would be less than indicated in FIG. IV and may be conveniently so selectively limited as by snubbers 51 or 52 of FIGS. XXII and XXIII, while the entire cushioning elevating and ride supporting assembly may be movably mounted upon and secured to the car as by elements 55, 56 and 57 shown in FIGS. XXVI and XXVII.

Other means, than that shown on FIG. XXI, indicated at 51, 52, 53a and 54a, may be used to urge the trailer or box onto the receiver, such as rack and pinion powered by modified forms of torque wrenches, which mechanisms are readily available from such sources as Black and Decker.

On arriving at destination, the trailer could readily be unloaded from the flat car onto a tractor by a substantial reversal of the movements of loading onto the flat car and could readily be accomplished by those skilled in the art without detailed description.

What I claim is:

1. A load handling and cushioning device, comprising a lower base plate; an upper plate disposed in a substantially horizontal plane thereabove; guide members carried by said plates and disposed to mutually interfere to limit the relative motion therebetween, the areas of the plates being large as compared with the maximum vertical separation between the plates permitted by the guide means; load receiving and engaging means carried on said upper plate; plural inflatable air tube means of flattened annular shape interposed between said plates and mutually spaced apart in two normal horizontal directions, the mutually adjacent faces of the plates having opposed bowl-shaped cavities receiving each air tube means, the cavities being deep enough that when the tube means is deflated the plates come together without pinching the periphery of the tube means therebetween, said lower plate having air ducts therethrough individually communicating with each one of the air tube means; and individual air supply line and valve means coupled to each duct for selectively inflating the air tube means to relative degrees required to float the upper plate substantially level on the lower plate despite unequal distribution of load weight on the air tube means.

2. A load handling and cushioning device, comprising a lower base plate; an upper plate disposed in a substantially horizontal plane thereabove; guide members carried by said plates and disposed to mutually interfere to limit the relative motion therebetween and including a center pin fixed in the base plate and extending upwardly therefrom and having an enlarged head, the areas of the plates being large as compared with the maximum vertical separation between the plates permitted by the guide means; load receiving and engaging means carried on said upper plate and including turntable means having a countersunk central hole therethrough receiving said pin; inflatable air tube means interposed between said plates and mutually spaced apart in two normal horizontal directions, the surfaces of the plates having cavities recessed around portions of each air tube means to receive the peripheries thereof when the tube means is deflated to prevent pinching of the periphery of the tube means between the plates; and individual duct and valve means coupled to each air tube means for selectively inflating the air tube means to relative degrees required to float the upper plate substantially level on the lower plate despite unequal distribution of load weight on the air tube means.

3. A load handling, leveling and cushioning device, comprising three stacked plates including two outer plates for supporting the device and the load and one intermediate plate located therebetween, one of the plates having at its center a fixed pin extending at right angles thereto and transfixing each of the other plates at a central hole therethrough; guide means carried by the intermediate plate and by one of the outer plates and mutually inter-engaging to limit the separation therebetween and to prevent mutual rotation, the mutually opposed surfaces of the last-mentioned two plates having plural areas which are mutually spaced apart in two normal horizontal directions with respect to the pin, and both opposed plates at each of said areas being contoured with opposing aligned annular cavities; inflatable air tube means interposed between said plates at each of said contoured areas and separating the plates when inflated and when deflated having annular peripheries which correspond in shape and location with the associated cavities and occupy the latter, one of the contoured plates having air ducts therethrough individually communicating with each one of the air tube means; air supply line means connected with each duct; and separately controllable valve means located in each air-supply line means, whereby at least one of the air tube means may be pressurized to a greater extent than the remaining air tube means to thereby level said load lines connected with each of said air ducts.

4. In a device as set forth in claim 3, said guide means comprising projections fixed in one of the contoured plates and extending toward the other contoured plate, the latter having receptacles to loosely receive said projections and flexible snubber means to limit the mutual separation of these plates.

5. In a device as set forth in claim 3, said guide means comprising flange means on at least one contoured plate for loosely receiving the other contoured plate; and flexible snubber means to limit the mutual separation of these plates.

6. In a device as set forth in claim 3, said guide means comprising projections fixed in one contoured plate and extending toward the other contoured plate, the latter having receptacles loosely receiving said projections, and abutments on the projections disposed to prevent withdrawal thereof from said receptacles.

7. In a device as set forth in claim 3, at least two of the air tube means being spaced side-by-side between said contoured plates; and strap means on the opposite side of one air tube means from the other and interconnecting the contoured plates on that side, whereby when the adjacent air tube means is inflated, the plates will separate in the vicinity of the other of these air tube means.

8. In a device as set forth in claim 3, the non-contoured plate comprising a turntable pivotally supported adjacent said intermediate plate on said center pin, one of these plates having a circular series of spaced slots; and latch means for locking these plates against relative rotation and including releasable dog means carried by the other plate and selectively engaging at least one of said slots.

9. In a device as set forth in claim 3, said air tube means being of flattened annular shape, and said contoured plates having on their mutually adjacent faces within said cavities opposed circular air-tube abutting bosses of diameter smaller than the diameter of the air tube means therebetween when deflated.

10. In a device as set forth in claim 9, at least one rigid spacer interposed between said contoured plates, the spacer having raised bosses of the same diameter as said first-mentioned bosses, and air tube means interposed between the bosses on the plates and the bosses on the spacer to form vertically-stacked multiple cushioning layers.

11. In a device as set forth in claim 3 for supporting a load having a downwardly extending king pin, the non-contoured plate comprising a king pin receiving plate located on top of said intermediate plate and having a slot extending across the full width of the king-pin receiving plate and tapering down from each end of the slot to a narrow central slot of width approximately equalling the diameter of the king pin; and latch means for releasably trapping the king pin in said narrow central portion of the slot.

12. In a device as set forth in claim 3, a supporting plate disposed below and slidably supporting the lowermost of said outer plates; sliding horizontal guide means interconnecting said lowermost plate and said supporting plate and permitting back and forth movement of the lower plate in one direction; and spring means connected between the supporting plate and the lowermost plate and yieldably urging the latter toward the center of the former.

References Cited in the file of this patent

UNITED STATES PATENTS

| | | |
|---|---|---|
| 691,862 | Herpolsheimer | Jan. 28, 1902 |
| 1,108,768 | Lewis | Aug. 25, 1914 |
| 1,524,505 | Blue | Jan. 27, 1925 |
| 1,621,035 | Storer et al. | Mar. 15, 1927 |
| 1,734,303 | Ross | Nov. 5, 1929 |
| 1,745,959 | Steiner | Feb. 4, 1930 |
| 2,004,095 | Hankins et al. | June 11, 1935 |
| 2,117,068 | Ludington | May 10, 1938 |
| 2,144,410 | Ludington | Jan. 17, 1939 |
| 2,633,811 | Poage | Apr. 7, 1953 |
| 2,733,931 | Reid et al. | Feb. 7, 1956 |
| 2,831,440 | Lich | Apr. 22, 1958 |
| 2,933,052 | Mellam | Apr. 19, 1960 |
| 2,933,053 | Mellam | Apr. 19, 1960 |

FOREIGN PATENTS

| | | |
|---|---|---|
| 10,437 | Great Britain | May 27, 1895 |
| 220,310 | Australia | July 10, 1958 |